Nov. 15, 1966  J. C. L. LESLIE  3,284,923
TEACHING MACHINE WITH PROGRAMMED MULTIPLE TRACK FILM
Filed July 16, 1964
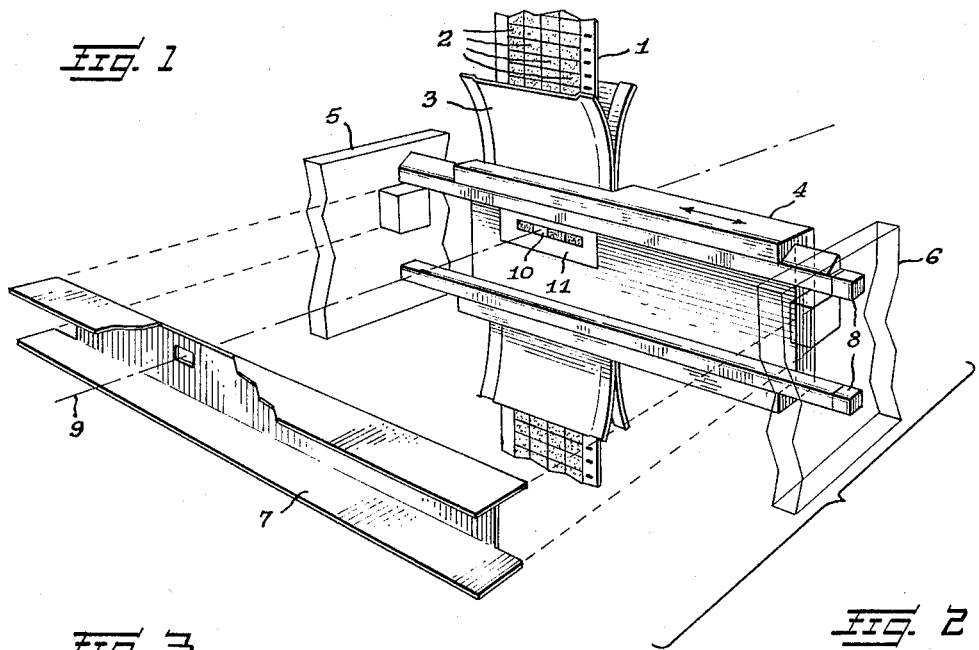
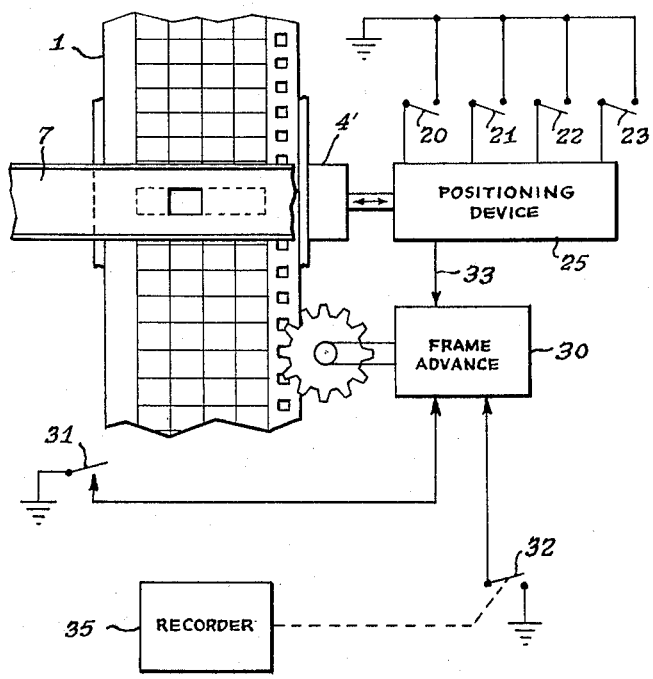
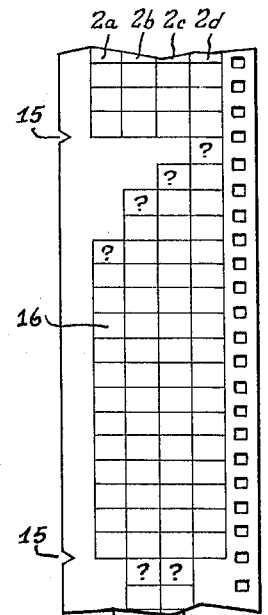
INVENTOR
John C. L. Leslie
BY *Watson, Cole, Grindle & Watson*
ATTORNEYS

3,284,923
TEACHING MACHINE WITH PROGRAMMED MULTIPLE TRACK FILM

John C. L. Leslie, Albuquerque, N. Mex., assignor to Educational Research Associates, Inc., Albuquerque, N. Mex., a corporation of New Mexico
Filed July 16, 1964, Ser. No. 383,070
3 Claims. (Cl. 35—8)

This application is a continuation-in-part of the copending application, Serial No. 213,233, filed July 30, 1962, now abandoned, for "Programmed Film Teaching Machine and Method."

This invention relates to multiple-channel visual presentation of information as it is applied to a system of programmed instruction (teaching machines) and to other systems. The invention comprises two principal components: a multiple-channel strip of photographic projection film which has a plurality of image areas thereon and a channel switching device. A general object of the invention is to provide improved teaching machines and methods.

Another object of the invention is to provide a multiple-channel strip of projection film wherein each channel consists of a plurality of frames or image areas containing programmed information arranged to present a multiplicity of different programs in a frame by frame path through various channels.

A further object of the invention is to furnish manually operable channel-switching means for defining a channel-to-channel path through the multiple-channel film strip.

Additional objects and a better understanding of this invention may be had by referring to the following description and claims, when taken in conjunction with the accompanying drawing of which:

FIGURE 1 is an exploded view, partly in phantom, of a selector mechanism provided in accordance with the invention;

FIGURE 2 is a detailed view of a multiple channel film strip of the invention; and FIGURE 3 is a diagrammatic view of a manually operable semi-automatic teaching system.

The invention illustrated in the drawing comprises a multiple-channel projection film 1 consisting of four channels, each channel containing a series of frames or image areas 2. The invention is in no way limited to a projection film with four channels thereon, four channels being used by way of illustration only. The invention further comprises a filmgate 3 through which film 1 is advanced by any conventional frame to frame advancing means.

In the preferred embodiment of the invention four frames are illustrated in the filmgate 3. The four channels are programmed in text sequences each having material of different difficulty or scope of information thereon. This may be seen from FIGURE 2, where the channels are subdivided into segments marked by indicia 15, and frames 16. The film strip may typically be advanced from frame to frame within a channel at a single position of filmgate 3 until it reaches the end frame of each segment marked by the question mark. At that frame an operator may answer a multiple choice question posed on the film which will direct him to choose the appropriate channel 2a to 2d in the next segment.

When the operator of the apparatus responds to questions by pushing one of four buttons 20–23 (FIGURE 3) selector shuttle 4', which is actuated by a conventional positioning device 25 automatically moves to select the channel at the start of the next segment with the correct degree of difficulty of scope of information to be projected as determined from the choice to the question posed.

Selector shuttle 4 as shown in the embodiment of FIGURE 1 is movable between walls 5 and 6 shown in phantom as located on the selector shuttle housing. A stationary single-frame mask 7 (shown removed in the drawing for clarity) is mounted between housing walls 5 and 6 and is adjacent to selector shuttle 4.

As selector shuttle 4 is actuated along shuttle tracks 8, in the direction of travel illustrated in the drawing, projection film 1 and filmgate 3 are moved into selective alignment with single-frame mask 7. Light beam 9 formed by an appropriate light source and lenses (not shown) passes through single frame-mask 7 and through selected frame 10 of projection film 1 and forms an image of only the selected frame 10 on a screen (not shown). Thus only one frame in the selected channel is viewable at any time and all other information is obscured from the learner.

The selector shuttle 4 has an opening 11 therein, which is larger than one row of frames, through which a light beam can pass. The filmgate 3 is mounted over opening 11 and at right angles to the line of motion of the selector shuttle 4. The filmgate 3 has an aperture that corresponds in dimension to one row of images. Single-frame mask 7 is secured to the housing and positioned adjacent to the selector shuttle 4. Single-frame mask 7 has a single aperture that corresponds to the size of the individual single-channel image area and aligns with the aperture in the filmgate 3. As the selector shuttle 4 moves horizontally, it brings different individual single-channel image areas into alignment with the aperture in the single-frame mask 7. Because the aperture is the size of only a single image area, it permits projection of only one image area in a row at a time; all other image areas in the row are covered by that portion of the single-frame mask 7 that does not contain the aperture and are therefore denied projection.

Each learner response to the question frame determines the next position of the selector shuttle 4 and therefore the next channel of image areas 2 to be selected for projection. The particular combination of learner responses for all of the response points on a given strip of film will prescribe the path selected longitudinally through the film from channel to channel. The information contained in the corresponding frames of each channel may differ from each other to produce a plurality of different composite presentations as the various segments are chosen in sequence. The degree of accuracy or inclination of learner response to the questions or options presented in certain image areas, called response points, determines the channels from which succeeding image areas will be projected, so that he has only in this machine to advance frames and answer questions. Thus he does not detract from learning to operate a complex machine.

The simplicity of this teaching method of visually presenting programmed instruction material by choosing a series of frames in a wandering path through a plurality of different film channels in sequence by manual response to questions posed at response points is illustrated by the system shown in FIGURE 2.

Assume the positioning device 25 to contain four relays; for example, moving channel selector 4' to respective positions depending upon choice of push button switches 20–23. Frame advance mechanism 30 merely advances the film frame by frame responsive to closure of switches 31 and 32. Thus, an operator can read frame by frame as fast as he wishes by pushing button 32. However, when he reaches the response point ?, he answers a multiple choice question by pushing the appropriate button 20–23 to choose the next program segment.

A typical teaching program could constitute the following exemplary text at the response point: Does the foregoing material indicate that an isometric presentation constitutes (a) a plan view (2) an elevation view (3) a photography or (4) a perspective view. Thus the following segment would include in the four channels respectively (a) review of plan views and isometric material, (b) review of elevation views and isometric material, (c) a basic review of several drawing techniques and (d) an enrichment program of further details of isometric drawings before embarking into further teaching areas. Thus, the branching technique of self-teaching machines can be fully exploited in the semi-automatic machine simply and without detraction to the student.

The frame advance means 30 can further simply distinguish the end of a segment by actuation of a button 20–23 and step frame by frame to the marker 15 at the beginning of the next segment so that the operator need not concern himself with reaching a starting point. This is accomplished by switch 31, for example, in reaching a notch 15 in the tape. Thus, lead 33 will place the frame advance means 30 in a continuous stepping mode which reverts to step-by-step mode when switch 31 closes as notches 15 are reached.

Accordingly no thought need be given machine operation to detract from the learning response, and yet the mechanism is extremely simple.

A more fully automatic machine would permit audio-visual information where an auxiliary recorder 35 would lecture and close switch 32 appropriately to advance information at the end of an audio discussion period in response to detection of a tone signal for example.

Although this invention has been described with a certain degree of particularly, it is understood that the present disclosure has been made only by way of example and that other changes in the details of construction such as employment of moving pictures, and arrangement of parts may be resorted to without departing from the spirit and scope of the invention as hereinafter claimed.

What is claimed is:

1. In a teaching device deriving from a film strip differing sequences of images responsive to selection of desired subject matter by individual students, apparatus adapted to present a longitudinal film strip divided into a plurality of side-by-side channels, each channel disposed along the length of the film strip with a plurality of sequential frames occupying adjacent frame positions sequentially presented along its length, the film strip being subdivided along its length into a plurality of segments with a plurality of frames therein, in which each channel presents in the plurality of frames within the segment an instructive program differing in content from the plurality of frames within the segments of the other corresponding channels, comprising in combination, selective control means for advancing said film strip frame by frame in a single direction for viewing all sequential frame positions in sequence along the length of the film, channel selecting means comprising a movable shuttle with a single channel viewing aperture operable to move between said channels to uniquely select at each frame position a single one of said channels, manual position selection means for operating the movable shuttle at the end of each of said segments to that unique one of the channels in which the frames within the next one of the film segments are to be sequentially presented, whereby a complete variable instruction program is presented in sequential frame by frame order from a viewing path which can move from channel to channel under operator control at the end of each said film segment.

2. A machine as defined in claim 1 wherein the means for advancing film is operated responsive to an audio program.

3. Apparatus as defined in claim 1 including segment markers on said film designating the boundaries of the segments, programmable means operating said selective control means automatically to advance the film frame by frame within each segment, detection means responsive to said markers on the film, and control means coupled for operation by said detection means to terminate the automatic operation of said selective control means.

References Cited by the Examiner
UNITED STATES PATENTS 1,164,859    12/1915    Pietzsch et al. _____ 35—8
3,164,859    7/1964    Chapman et al. _____ 35—8

EUGENE R. CAPOZIO, *Primary Examiner.*

JEROME SCHNALL, *Examiner.*

R. KLEIN, *Assistant Examiner.*